United States Patent [19]

Shimizu et al.

[11] Patent Number: 5,400,236
[45] Date of Patent: Mar. 21, 1995

[54] INVENTOR-CONTROLLED POWER UNIT

[75] Inventors: Motohiro Shimizu; Masashi Nakamura, both of Wako, Japan

[73] Assignee: Honda Giken Kogyo Kabushiki Kaisha, Tokyo, Japan

[21] Appl. No.: 903,517

[22] Filed: Jun. 24, 1992

[30] Foreign Application Priority Data

Jul. 3, 1991 [JP] Japan .................................. 3-189142

[51] Int. Cl.$^6$ ........................................... H02M 5/458
[52] U.S. Cl. ........................................ 363/37; 363/56; 363/95; 363/131; 363/71
[58] Field of Search ....................... 363/37, 56, 57, 58, 363/95, 96, 97, 98, 131, 132, 135, 136, 71; 323/212; 361/90, 91, 111; 322/28

[56] References Cited

U.S. PATENT DOCUMENTS

| 4,733,341 | 3/1988 | Miyazawa | 363/71 |
| 4,876,637 | 10/1989 | Mose et al. | 363/37 |
| 5,258,700 | 11/1993 | Shimizu et al. | 322/28 X |
| 5,282,124 | 1/1994 | Nakamura et al. | 363/56 X |

FOREIGN PATENT DOCUMENTS 56-20782 2/1981 Japan .
62-145440 9/1987 Japan .

*Primary Examiner*—Steven L. Stephan
*Assistant Examiner*—Y. Jessica Han
*Attorney, Agent, or Firm*—Frishauf, Holtz, Goodman & Woodward

[57] ABSTRACT

An invertor-controlled power unit includes a direct current power source circuit, an invertor circuit, and a pair of output lines. A waveform of voltage appearing between the output lines is detected. There is generated a target output waveform signal having a predetermined frequency. The target output waveform signal is converted into a control signal, which is then supplied to the invertor circuit. The invertor circuit effects switching control of an output from the direct current power source circuit in response to the control signal. There is detected an overvoltage state of the direct current power source circuit. The generation or supply of the control signal is inhibited while there is detected the overvoltage state of the direct current power source circuit. The control signal starts to be supplied again to the invertor circuit at a timing at which the detected waveform of the voltage between the output lines crosses a substantially zero volt level.

5 Claims, 13 Drawing Sheets

INVENTOR-CONTROLLED POWER UNIT

BACKGROUND OF THE INVENTION

1. Field of the Invention

This invention relates to an invertor-controlled power unit, and more particularly to an invertor-controlled power unit which is adapted to perform parallel operation together with other power units connected therewith.

2. Prior Art

In starting parallel operation of a plurality of invertor-controlled power units connected in parallel with each other, there are a case where an invertor-controlled power unit in stoppage have output lines thereof connected to output lines of an invertor-controlled power unit which has already been started to generate electricity, and then the power unit in stoppage is started for parallel operation, and a case where a plurality of invertor-controlled power units are first started to generate electricity and then have output lines thereof directly connected in parallel with each other to start parallel operation of the power units.

In both cases, a phase difference between waveforms of output voltages from the invertor-controlled power units in parallel operation causes electric current to alternately flow from one power unit to another due to a difference in output voltage between the power units, which may destroy component parts of the power units. Therefore, it is necessary to synchronize the phases of the output voltages from the power units with each other.

To this end, even in the case of parallel operation of identically-constructed invertor-controlled power units, it is required to provide wiring for transmitting signals for informing each other of operating conditions thereof. Further, as disclosed e.g. in Japanese Patent Publication (Kokoku) No. 56-20782, it is required to employ an automatic synchronizing device, and means for producing an operating point at which the phases coincide with each other, to thereby cause the automatic synchronizing device to reliably operate at early timing. Further, as disclosed in Japanese Provisional Utility Model Publication (Kokai) No. 62-145440, a special adaptor is used for parallel operation of two power units, with one of them serving as a master generator while the other serves as a slave generator.

SUMMARY OF THE INVENTION

It is an object of the invention to provide an invertor-controlled power unit which can dispense with the use of special means such as an automatic synchronizing device and a special adaptor for carrying out parallel operation of a plurality of invertor-controlled power units, and which is capable of starting parallel operation of a plurality of power units even when one or more of the power units have already been started to generate electricity.

Another object of the invention is to provide an invertor-controlled power unit which is capable of starting its operation without a driving signal supplied to an invertor circuit thereof becoming unstable upon starting the parallel operation of the power units.

To attain the objects, the present invention provides an invertor-controlled power unit including a direct current power source circuit, an invertor circuit for effecting switching control of an output from the direct current power source circuit in response to a control signal to thereby convert the output into an alternating current output having a predetermined frequency, and a pair of output lines conducting the alternating current output from the invertor circuit.

The invertor-controlled power unit according to the invention is characterized by comprising:

voltage waveform-detecting means for detecting a waveform of voltage appearing between the output lines;

overvoltage-detecting means for detecting an overvoltage state of the direct current power source circuit;

reference signal-generating means for generating a target output waveform signal having the predetermined frequency, the invertor circuit effecting the switching control of the output from the direct current power source circuit based on the target output waveform signal;

control signal-generating means for converting the target output waveform signal into the control signal and supplying the control signal to the invertor circuit;

inhibiting means for rendering the control signal-generating means inoperative while the overvoltage-detecting means detects the overvoltage state of the direct current power source circuit; and synchronizing means for causing the control signal-generating means to start supplying the control signal to the invertor circuit at a timing at which the waveform of the voltage between the output lines detected by the voltage waveform-detecting means crosses a substantially zero volt level.

Preferably, the invertor-controlled power unit includes a low-pass filter for shaping a waveform of an output from the power unit, and the low-pass filter comprises inductance elements connected between the output lines, the invertor circuit cooperating with the low-pass filter to convert the output from the direct current power source circuit into the alternating current output having the predetermined frequency.

More preferably, the synchronizing means renders inoperative the control signal-generating means and inhibits the reference signal-generating means from supplying the target output waveform signal to the control signal-generating means, while the overvoltage-detecting means detects the overvoltage state of the direct current power source circuit.

Further preferably, the invertor-controlled power unit includes current waveform-detecting means for detecting a current waveform of the alternating current output having the predetermined frequency, phase difference-detecting means for detecting a difference in phase between the current waveform detected by the current waveform-detecting means and the voltage waveform detected by the voltage waveform-detecting means, and reference signal-correcting means for modifying a frequency of the target output waveform signal in a manner such that the difference in phase detected by the phase difference-detecting means is reduced.

According to the invertor-controlled power unit of the invention, the switching control of the invertor circuit is carried out in response to the control signal formed based on the target output waveform signal to thereby obtain alternating current output having a waveform corresponding to the target output waveform. When an overvoltage state of the direct current power source circuit is detected, which is caused by a deviation in the phase between the output voltages from the power units connected with each other for parallel operation, the invertor circuit of the power unit in which the direct current power source circuit is detected to be in the overvoltage state is once rendered inoperative by inhibiting the supply of the control signal thereto, and after the overvoltage state is eliminated, the invertor circuit is again started to effect switching control at timing at which the waveform of the output voltage from another invertor-controlled power unit connected for parallel operation crosses a zero volt level. Therefore, when the present invertor-controlled power unit again starts generating AC output, there hardly arises a difference in phase between the waveforms of the output voltages from the power units connected to each other for parallel operation. Further, there is no disturbance of the control signal supplied to the invertor circuit since the invertor circuit is again started at the zero volt timing of the control signal.

The frequency of the target output waveform signal is controlled in a feedback manner responsive to the phase difference between the output voltage of the alternating current output and the output current thereof such that the phase difference is reduced to zero. This enables parallel operation of the invertor-controlled power units.

When there is a phase difference in voltage between power units in parallel operation, there arises a flow of current between the power units. Accordingly, in one power unit, the voltage of AC output therefrom has an advanced phase relative to the current of same, while in another power unit, the voltage of AC output therefrom has a retarded phase relative to the current of same. Therefore, if the voltage and current of AC output are put in phase in the present power unit, the voltage of AC output from the present power unit and the voltage of AC output from another power unit necessarily become in phase.

The above and other objects, features, and advantages of the invention will be more apparent from the ensuing detailed description taken in conjunction with the accompanying drawings.

DETAILED DESCRIPTION

The invention will now be described in detail with reference to the drawings showing an embodiment thereof.

Figure 1:
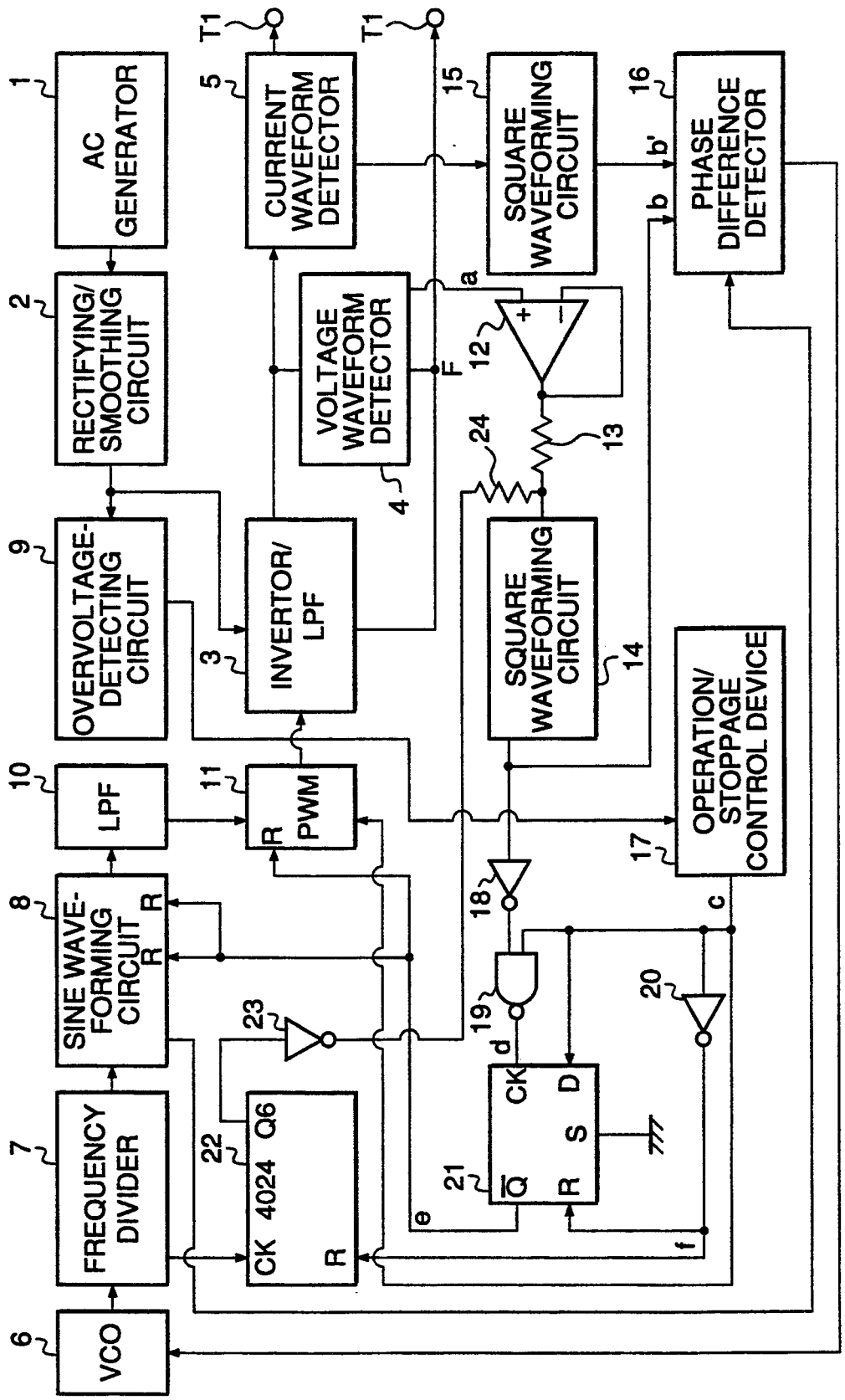
FIG. 1 is a circuit diagram schematically showing the whole arrangement of an invertor-controlled power unit according to an embodiment of the invention.
Figure 2A:
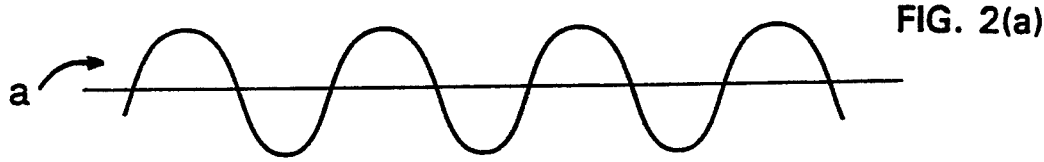
FIG. 2 is a timing chart useful in explaining the operation of the invertor-controlled power unit shown in FIG. 1.
Figure 2B:
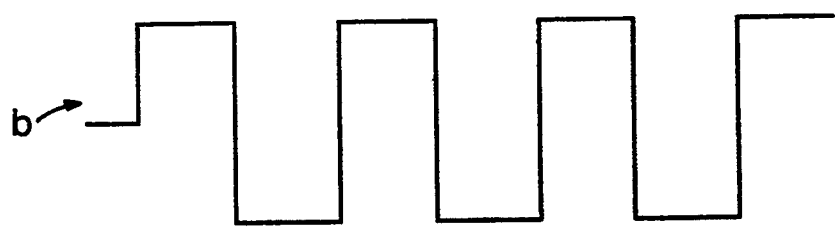
Figure 2C:
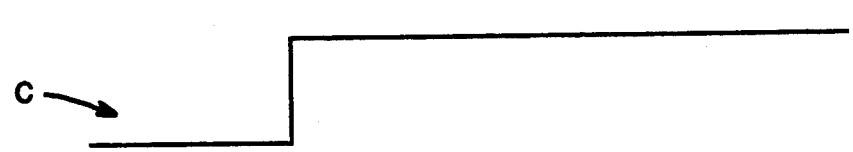
Figure 2D:
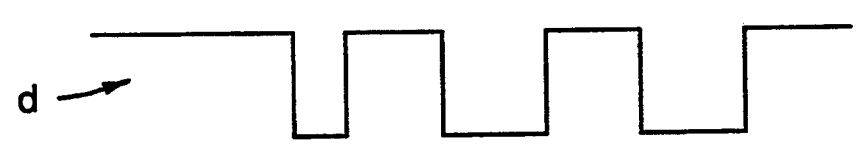
Figure 2E:
Figure 2F:

Referring first to FIG. 1, there is shown the whole arrangement of an invertor-controlled power unit according to an embodiment of the invention. In the figure, reference numeral 1 designates an AC generator 1 which has its output connected to the input of a rectifying/smoothing circuit 2. The output of the rectifying/smoothing circuit 2 is connected to the input of an overvoltage-detecting circuit 9 and the input of an invertor circuit and low-pass filter (hereinafter referred to as "the invertor/LPF") 3. The output of the invertor/LPF 3 is connected via a voltage waveform detector 4 and a current waveform detector 5 to output terminals T1. The output of the overvoltage-detecting circuit 9 is connected to an operation/stoppage control device 17.

On the other hand, a voltage-controlled type oscillator (hereinafter referred to as "the VCO") 6 which outputs an oscillation signal to be converted into a target output waveform signal has an output thereof connected to the input of a frequency divider 7. The output of the frequency divider 7 is connected to the input of a sine wave-forming circuit 8 for generating the target output waveform signal, and the output of the sine wave-forming circuit 8 is connected via a low-pass filter (hereinafter referred to as "the LPF") 10 to the input of a pulse width-modulator (hereinafter referred to as "the PWM") 11.

Further, the output of the voltage waveform detector 4 is connected to a non-inverting input terminal of an operational amplifier 12, the output of which is connected via a resistance 13 to the input of a square wave-forming circuit 14. The output of the square wave-forming circuit 14 is connected to the input of an invertor 18 and the input of a phase difference detector 16. The output of the current waveform detector 5 is connected via a square wave-forming circuit 15 to the input of the phase difference detector 16. The output of the phase difference detector 16 is connected to the input of the VCO 6. The input of the phase difference detector 16 is also connected to the output of the sine wave-forming circuit 8.

Further, the input of a NAND circuit 19 is connected to the output of the invertor 18 as well as to the output of the operation/stoppage control device 17. The output of the operation/stoppage control device 17 is connected to a D input terminal of a D flip flop 21 as well as to the input of an invertor 20. The D flip flop 21 has a CK (clock) input terminal thereof connected to the output of the NAND circuit 19, an R (resetting) terminal thereof connected to the output of the invertor 20, and a Q-bar output (inverting output) terminal thereof connected to an R (resetting) terminal of the PWM 11. Further, the output of the invertor 20 is connected to an R terminal of a counter 22. The counter 22 may be formed by, for example, a μPD4024 manufactured and sold by NEC Corporation, Tokyo, Japan. The counter 22 has a CK terminal thereof connected to the output of the frequency divider 7 and a Q6 output terminal thereof connected to the input of an invertor 23. The output of the invertor 23 is connected via a resistance 24 to the input of the square wave-forming circuit 14.

The parallel operation of the invertor-controlled power unit constructed as above is carried out by connecting the output terminals T1 of the present power unit to the output terminals T1 of another power unit.

Next, the operation of the invertor-controlled power unit shown in FIG. 1 will be described.

AC current from the AC generator 1 is rectified and smoothed by the rectifying/smoothing circuit 2 into DC power. The DC power is converted into AC power by the invertor/LPF 3 under the control of the PWM 11, and the resulting AC power is supplied via the voltage waveform detector 4, the current waveform detector 5, and the output terminals T1, to a load connected to the output terminals T1.

When the output terminals of another invertor-controlled power unit in operation become parallely connected to the output terminals T1, a potential difference between the output voltages from the power units associated with each other for parallel operation, depending on the difference in phase between the two output voltages, causes electric current to alternately flow from one power unit into the other. This flow-in current causes an increase in the voltage of the rectifying/smoothing circuit 2 within the power unit by a voltage-transforming function of the inductance of devices interposed in the output lines, such as a choke coil of the LPF. When the rectifying/smoothing circuit 2 of the present invertor-controlled power unit is thus brought into an overvoltage state due to electric current having flowed in from the other power unit connected for parallel operation, the overvoltage-detecting circuit 9 detects the overvoltage state and causes the operation/stoppage control device 17 to interrupt switching operation of the invertor circuit of the invertor/LPF 3. When the invertor circuit of the invertor/LPF 3 thus ceases to perform switching operation, the output voltage from the other power unit associated for parallel operation is applied to the output terminals T1 of the present invertor-controlled power unit, and hence the voltage between the output lines of the present power unit has a waveform identical to that of the output voltage from the other power unit. The voltage waveform detector 4 detects the waveform of the output voltage from the other power unit applied to the output terminals T1 of the present power unit. The voltage waveform detector 4 outputs the detected voltage waveform signal, which is in the form of a sine wave as shown at (a) of FIG. 2. The detected voltage waveform signal a is supplied via the operational amplifier 12 to the square wave-forming circuit 14, where it is converted into a square wave signal b as shown at (b) of FIG. 2, which is supplied to the invertor 18 as well as to the phase difference detector 16. In the instant case, since the invertor circuit of the invertor/LPF 3 has been rendered inoperative, no signal is outputted from current waveform detector 5, and hence output voltage from the phase difference detector 16 is held at zero V, so that the VCO 6 emits an oscillation signal having a frequency corresponding to a control signal having zero volt, i.e. the output from the phase difference detector 16.

The oscillation signal from the VCO 6 is divided by the frequency divider 7 into a clock signal which is supplied to the sine wave-forming circuit 8. The sine wave-forming circuit forms, by the use of the clock signal, a sine wave signal having a stepped waveform, which is supplied via the LPF 10 to the PWM 11, which in turn generates a pulse signal which is pulse width-modulated by the sine wave signal. The LPF 10 shapes the sine wave signal having a stepped waveform into a sine wave signal having a smooth sinusoidal waveform.

When the invertor circuit of the invertor/LPF 3 is operating, the pulse signal from the PWM 11 controls the duration of activation of gates of the invertor circuit of the invertor/LPF 3 so that the invertor circuit converts the DC power into a pulse train having a pulse width variable with the sine wave signal from the LPF 10, and the LPF of the invertor/LPF 3 forms the output from the invertor circuit into AC power having a smooth sinusoidal waveform, which is outputted from the output terminals T1 via the voltage waveform detector 4 and the current waveform detector 5.

When the invertor circuit of the invertor/LPF 3 is rendered inoperative, the overvoltage state of the rectifying/smoothing circuit 2 is eliminated due to stoppage of flow-in of electric current via the output lines, and then an output signal c from the operation/stoppage control device 17 rises from a low level (i.e. stoppage) to a high level, as shown at (c) in FIG. 2.

The D terminal of the D flip flop 21 is then supplied with the output signal c, the CK input terminal with a NAND signal d (as shown at (d) in FIG. 2) depending on a signal obtained by inverting the square wave signal b and the output signal c, and the R terminal with a signal f (as shown at (f) in FIG. 2) obtained by inverting the output signal c. Accordingly, the D flip flop 21 generates through the Q-bar output terminal a signal Q-bar (as shown at (e) in FIG. 2) depending on the above signals c, d, and f. The relationship between the signal Q-bar and the signals c, d, and f is shown in a table given below. In this table, symbol " ↑ " designates rise of the pulse signal d, symbol " ↓ " fall of same, and "s" indicates a signal on the S terminal of the D flip flop 21, which is constantly at a low level. Further, symbol "*" means that the signal level may be either low (L) or high (H) (don't care).

TABLE

| d | c | f | s | $\overline{Q}_{n+1}$ |
| --- | --- | --- | --- | --- |
| ↑ | H | L | L | L |
| ↓ | H | L | L | $Q_n$ |
| * | L | H | L | H |

When the output signal c from the stoppage/operation control device 17 goes high, as shown in the second row of the table, the signal Q-bar goes low upon a first rise of the signal d (see (d) and (e) in FIG. 2) whereby the reset state of the sine wave-forming circuit 8 is cancelled to cause the target output waveform signal, which has been obtained by dividing the oscillation signal from the VCO 6 by the frequency divider 7 and converting the resulting signal into a stepped sinusoidal waveform by the sine wave-forming circuit 8, to be supplied therefrom to the LPF 10. Accordingly, the LPF 10 outputs the target output waveform signal having a smooth sinusoidal waveform to thereby permit the present power unit to supply AC power to the load.

Thus, the reset state of the sine wave-forming circuit 8 is cancelled at a zero crossing point at which the output voltage from the other invertor-controlled power unit associated with the present power unit, which is detected by the voltage waveform detector 4, upwardly crosses a zero level, and the invertor/LPF 3 starts switching operation at this timing, which enables the present power unit to perform a synchronized parallel operation together with the other power unit(s) connected in parallel therewith.

Once the parallel operation has started in this manner, the output voltage detected at the output lines by the voltage waveform detector 4 is converted into the aforementioned square wave signal b as shown at (b) of FIG. 2 by the square wave-forming circuit 14, while the output current detected by the current waveform detector 5 is converted into a similar square wave signal b' by the square wave-forming circuit 15, and both the signals b, and b' are supplied to the phase difference detector 16. The phase difference detector 16 supplies the aforementiond control signal having a voltage commensurate with a phase difference between the signals b and b' to the VCO 6 to control the frequency of the oscillation signal outputted therefrom. The oscillation signal is divided by the frequency divider 7, and the resulting aforementioned clock signal is supplied to the sine wave-forming circuit 8. Accordingly, the operation of the sine wave-forming circuit 8 is controlled by the clock signal responsive to the phase difference between the signals b and b'.

Further, when the present invertor-controlled power unit is not used for parallel operation but for single operation, the voltage waveform detector 4 detects no voltage waveform, so that no clock signal is supplied to the D flip flop 21, and hence the output from the Q-bar terminal is held at a high level (see the bottom row of Table), whereby the sine wave-forming circuit 8 remains in a reset state in which it does not generate the target output waveform signal, preventing the present power unit from supplying AC output to the load.

The counter 22 is provided for eliminating the above-mentioned inconvenience, i.e. it enables the power unit to start by itself. More specifically, if the operation/-stoppage control device 17 is not supplied from the overvoltage-detecting circuit 8 with a signal indicative of the overvoltage state of the rectifying/smoothing circuit 2, the output signal c therefrom goes high and hence the signal f goes low, so that the reset state of the counter 22 is cancelled, and after the counter 22 counts up a predetermined number of clock pulses supplied from the frequency divider 7 and equivalent to a predetermined time period, the output from the output terminal Q6 of the counter 22 changes from a low level to a high level and then to a low level, so that the output signal from the invertor 23 changes from a high level to a low level and then to a high level. Accordingly, as can be understood from the table, the output signal Q-bar from the D flip flop 21 goes low to cancel the reset state of the sine wave-forming circuit 8, enabling the present generator to generate AC power having a waveform based on the target output waveform signal from the sine wave-forming circuit 8.

Next, the component parts of the present invertor-controlled power unit appearing in FIG. 1 will be described in detail with reference to FIGS. 3 et seq.

Figure 3:
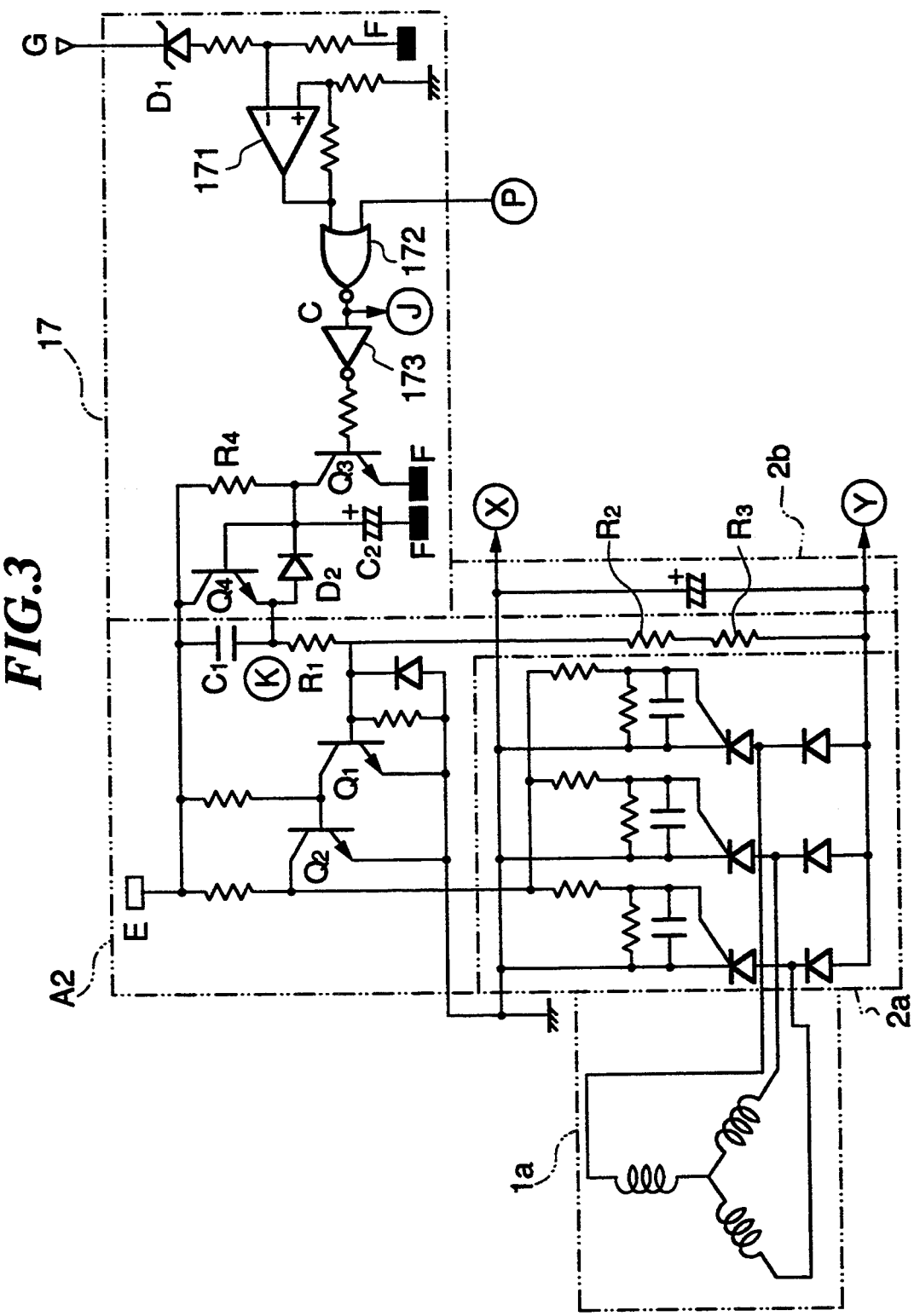
FIG. 3 is a circuit diagram showing details of a part of the invertor-controlled power unit shown in FIG. 1.
Figure 4:
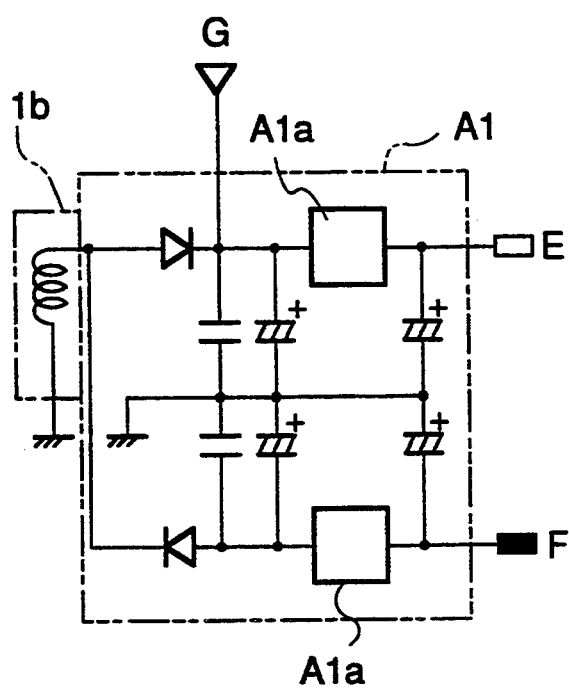
FIG. 4 is a circuit diagram showing details of another part of the invertor-controlled power unit shown in FIG. 1.

FIGS. 3 et seq. show the circuit arrangements of component parts appearing in FIG. 1 and circuits associated therewith. In FIGS. 3 and 4, reference numerals 1a and 1b designate, respectively, a three-phase output winding and a single-phase auxiliary winding wound on a common stator core, not shown, of the AC generator 1, separately from each other. A magnet rotor, not shown, having a plurality of magnetic poles is arranged to be rotatively driven by an engine, not shown. The three-phase output winding 1a has its output connected to a bridge rectifier 2a comprised of three thyristors and three diodes, which in turn has its output connected to a smoothing circuit 2b. The bridge rectifier 2a and the smoothing circuit 2b cooperatively form the rectifying/smoothing circuit 2.

The single-phase auxiliary winding 1b has its output connected to a constant-voltage regulator circuit A1 having positive and negative output terminals E and F. The constant-voltage regulator circuit A1 has two sets of rectifiers, smoothing circuits, and constant-voltage regulators A1a, one set being operable in response to current flowing in one direction from the auxiliary winding 1b, the other set in response to current flowing in the other direction so that the output terminals E, F supply positive constant voltage and negative constant voltage, respectively.

Reference numeral A2 designates a thyristor control circuit which has a power source-input terminal connected to the positive output terminal E of the constant-voltage regulator circuit A1, and another terminal grounded together with a positive terminal of the smoothing circuit 2b. The thyristor control circuit A2 has a signal-input terminal formed of a series circuit of a capacitor C1, and resistances R1 to R3. One end of the series circuit on the capacitor C1 side is connected to the positive output terminal E of the constant-voltage regulator circuit A1, while the other end of the series circuit on the resistance R3 side is connected to a negative terminal of the smoothing circuit 2b. The junction between the resistances R1 and R2 is connected to a base of a transistor Q1, which has a collector connected to a base of a transistor Q2. The transistor Q2 in turn has a collector connected to gate input circuits of the thyristors of the bridge rectifier 2a. The thyristor control circuit 6, which is arranged as above, controls input signals to the gate input circuits according to a potential at the junction between the resistances R1 and R2.

The junction K between the capacitor C1 and the resistance R1 is connected to the output of the operation/stoppage control device 17. The operation/stoppage control device 17 has a Zener diode D1, which has a cathode connected to an input terminal G of the constant-voltage regulator A1a provided on the positive output terminal E side of the constant-voltage regulator circuit A1, and an anode connected to the negative output terminal F of the constant-voltage regulator circuit A1 as well as to an inverting input terminal of an inverting comparator 171 formed of an operational amplifier, via resistances. The inverting comparator 171 has a non-inverting input terminal thereof grounded via a resistance. The output of the inverting comparator 171 is connected to one input terminal of a NOR circuit 172, which has another input terminal connected to the overvoltage-detecting circuit 9 which detects an overvoltage state of the present invertor-controlled power unit. The overvoltage-detecting circuit 9 supplies a high level signal to the NOR circuit 172 when it detects the overvoltage state. The output of the NOR circuit 172 is connected via an invertor 173 and a resistance to a base of a transistor Q3. The transistor Q3 has an emitter connected to the negative output terminal F of the constant-voltage regulator circuit A1, and a collector connected to the positive output terminal E of the constant-voltage regulator circuit A1 via a resistance R4 and to the negative output terminal F of the constant-voltage regulator circuit A1 via a capacitor C2. The capacitor C2 has a positive terminal connected to a base of a transistor Q4, which in turn has a collector connected to the positive output terminal E of the constant-voltage regulator circuit A1 and an emitter connected to an anode of a diode D2 and the junction K between the capacitor C1 and the resistance R1 of the thyristor control circuit A2. The diode D2 has a cathode connected to the positive terminal of the capacitor C2.

Figure 5:
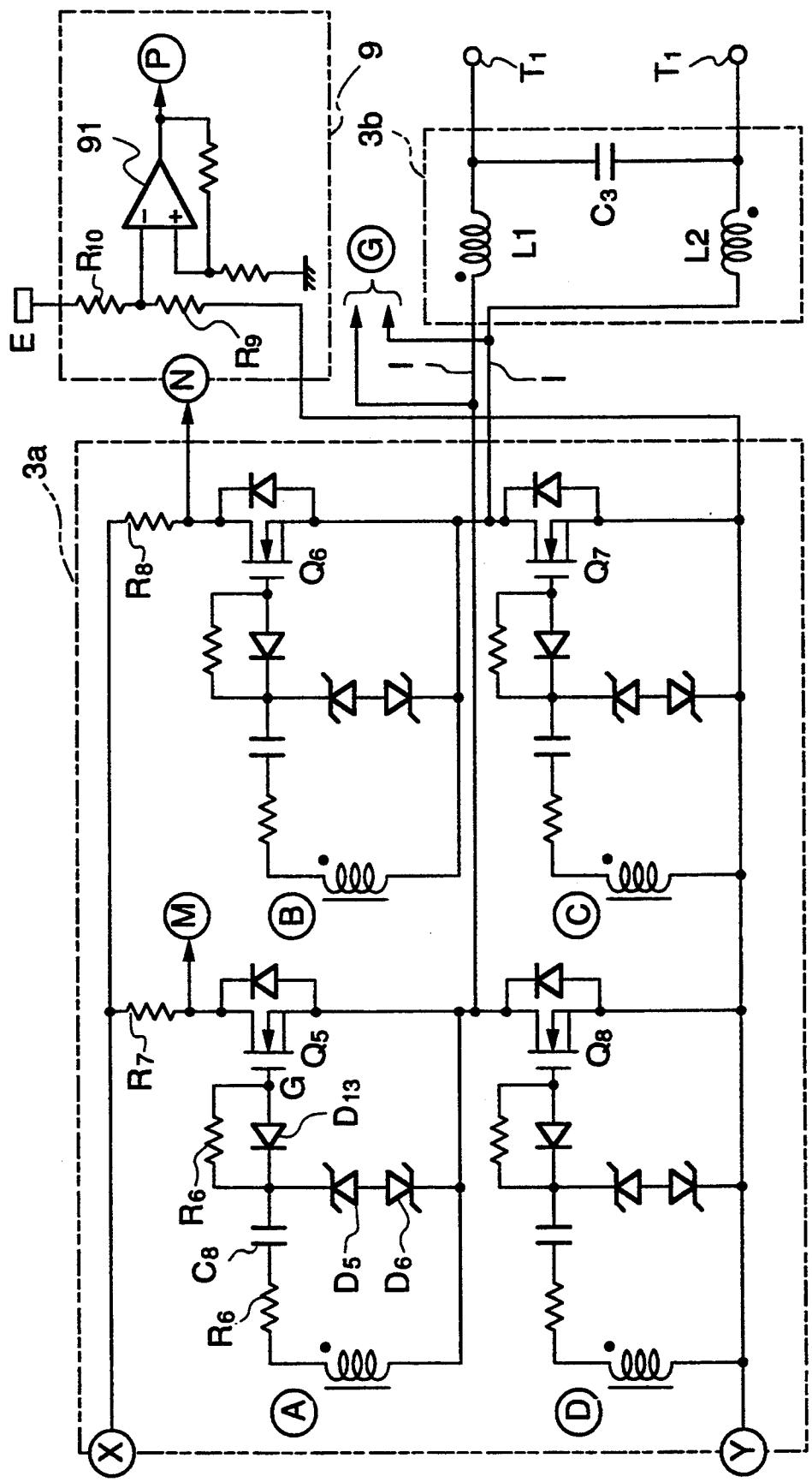
FIG. 5 is a circuit diagram showing details of a further part of the invertor-controlled power unit shown in FIG. 1.

The smoothing circuit 2b has its output connected to the invertor circuit (switching means) 3a of the invertor/LPF 3 shown in FIG. 5. The invertor circuit 3a is formed by a bridge circuit composed of four FET's (field effect transistors) Q5–Q8 as switching elements which have their gates connected to FET gate-driving signal circuits, hereinafter referred to.

The output of the invertor circuit 3a is connected via the low-pass filter (LPF) 3b of the invertor/LPF 3 to output terminals T11 and T12, which are connected to a load, not shown. The LPF 3b is formed of coils L1 and L2 connected in series to the load, and a capacitor C3 connected in parallel with the load.

The negative input side of the invertor circuit 3a is connected to a resistance 9 of the overvoltage-detecting circuit 9, which has the other end thereof connected to an inverting input terminal of an inverting comparator 91 comprised of an operational amplifier. The inverting input terminal of the inverting comparator 91 is connected via a resistance R10 to the positive output terminal E of the constant-voltage regulator circuit A1, while a non-inverting input terminal thereof is grounded via a resistance. The output terminal of the inverting comparator 91 is connected to the input of the NOR circuit 172 described above.

Figure 6:
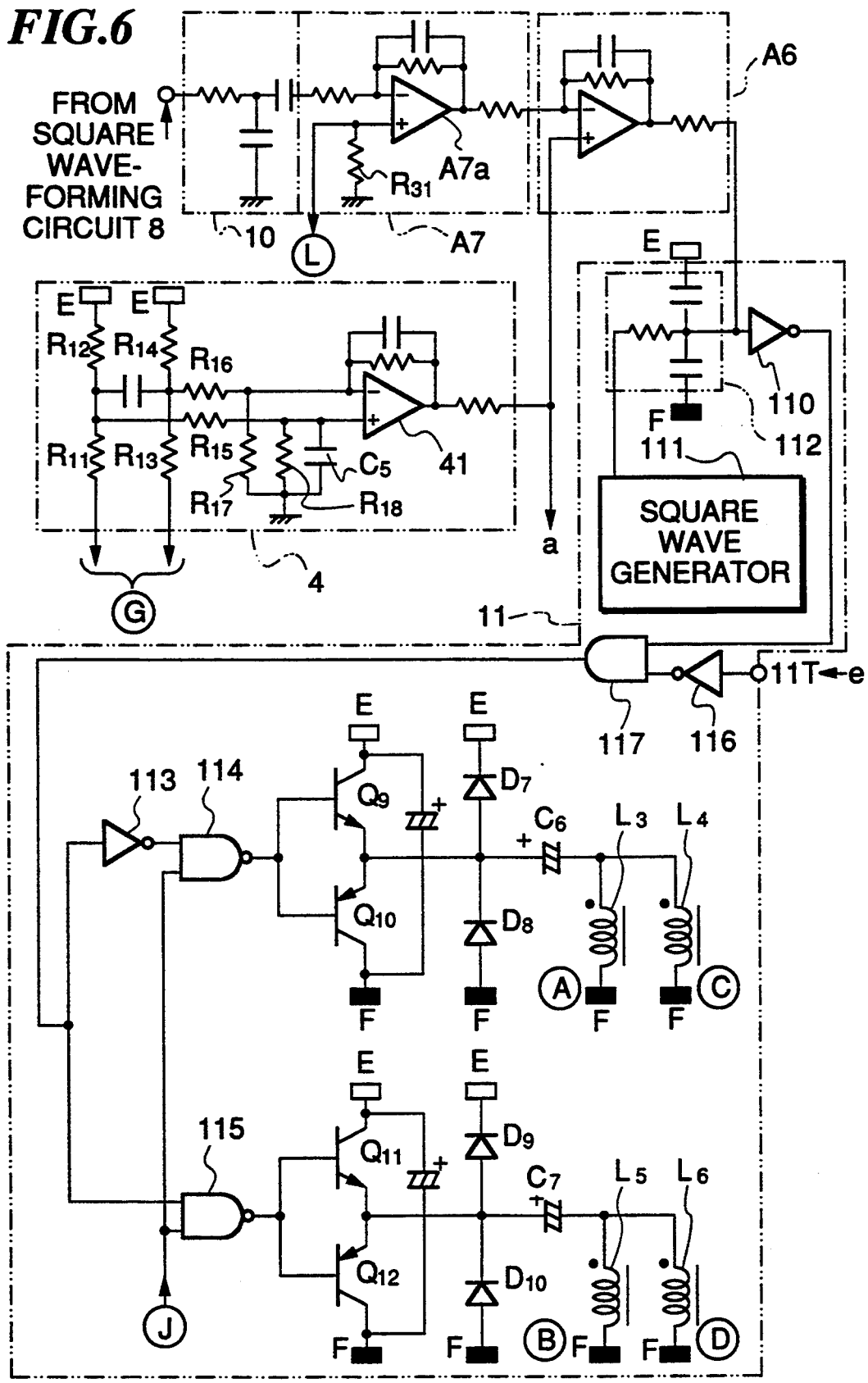
FIG. 6 is a circuit diagram showing details of still a further part of the invertor-controlled power unit shown in FIG. 1.

Output lines 1 extending from the invertor circuit 3a are connected, respectively, to ends (G) of series circuits formed by resistances R11 and R12, and R13 and R14 shown in FIG. 6. The other ends of these series circuits are connected to the positive output terminal E of the constant-voltage regulator circuit A1. The junction between the resistances R11, R12 and the junction between the resistances R13, R14 are connected, respectively, to a positive input terminal and a negative input terminal of an operational amplifier 41 through respective resistances R15 and R16, with a capacitor C4 for cutting off high frequency components connected between the two junctions. The operational amplifier 41 has the positive input terminal grounded via a capacitor C5 for cutting off high frequency components. The resistances R11–R14, capacitor C4, operational amplifier 41, and additional circuits associated therewith cooperate to form a voltage waveform detector 4.

Specifically, output voltages appearing on the two output lines 1 extending from the invertor circuit 3a are detected, after passing the voltage-dividing resistanes R11 and R12, and R13 and R14, as AC signals at the junction of the capacitor C4 with the resistance R15 and the junction of the capacitor C4 with the resistance R16, respectively.

The two AC signals are compared by the operational amplifier 41, which outputs a difference therebetween, i.e. an AC signal containing distortions in the waveform of the output voltage and/or offset components thereof outputted from the present power unit or applied by the other power unit (i.e. AC signal having an average voltage level proportional to distortions in the waveform and/or offset components of the voltage). The AC signal detected is amplified and supplied to a distortion-correcting circuit A6. Since the output voltage waveforms appearing on the two output lines are thus directly compared with each other, it is possible to accurately detect a distortion in the waveform of the output voltage.

Figure 7:
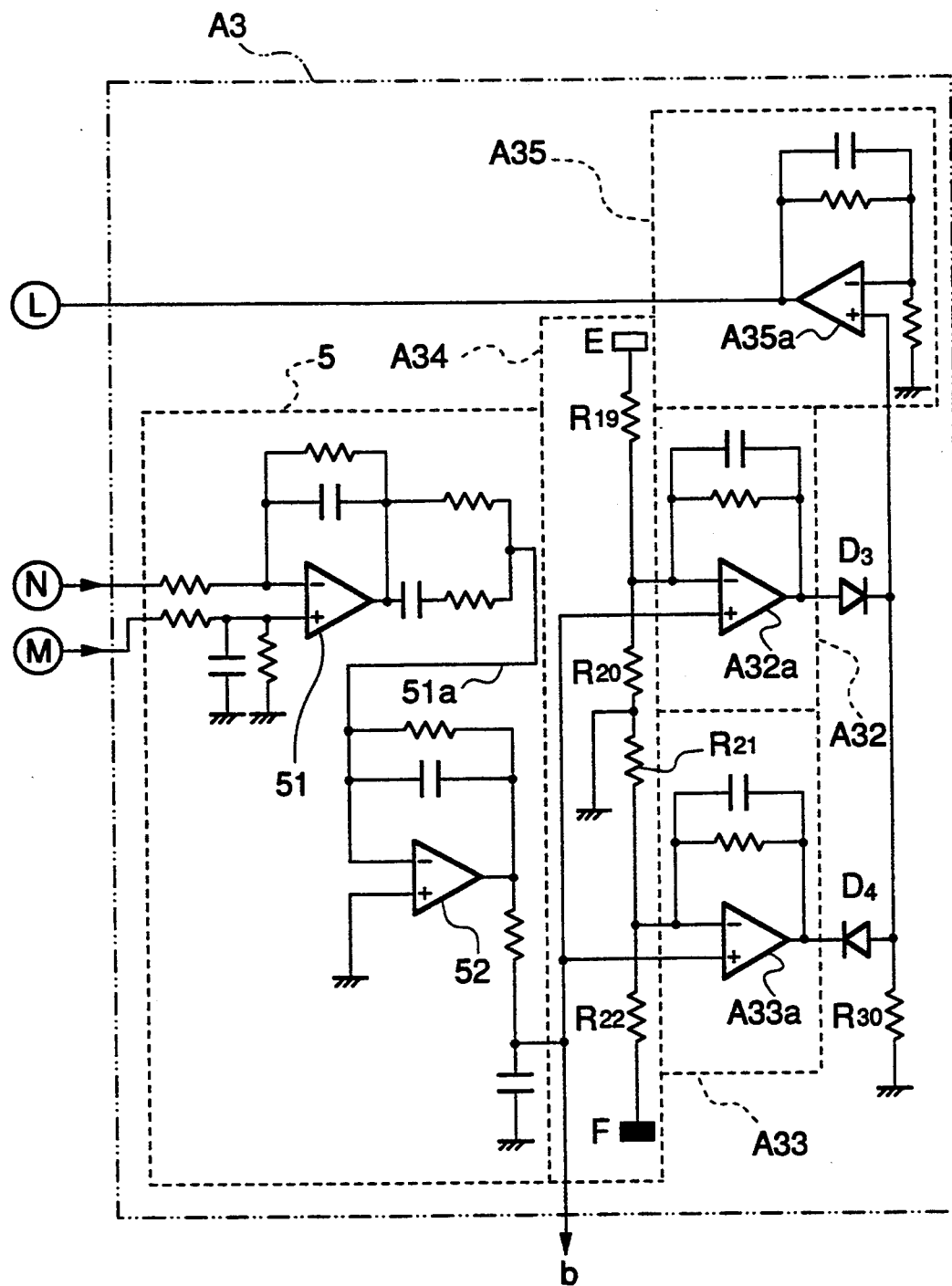
FIG. 7 is a circuit diagram showing details of another part of the invertor-controlled power unit shown in FIG. 1.

As shown in FIG. 5, current-detecting resistances R7 and R8 are connected between the drains of the respective FET's Q5 and Q6 of the invertor circuit 3a and the positive output terminal E of the constant-voltage regulator circuit A1. As shown in FIG. 7, the junction M of the current-detecting resistance R7 with the FET Q5 and the junction N of the current-detecting resistance R8 with the FET Q6 are connected, respectively, to a non-inverting input terminal and an inverting input terminal of an input side operational amplifier 51 of the current waveform detector 5. The output of the operational amplifier 51 is connected via an output line 51a to an output side operational amplifier 52. The output of the operational amplifier 52 is connected to non-inverting input terminals of an offset amplifier A32 and an offset amplifier A33.

Reference numeral A34 in FIG. 7 designates an upper and lower limit-setting circuit formed of a series circuit of resistances R19 to R22. One end of the series circuit is connected to the positive output terminal E of the constant-voltage regulator circuit A1 and the other end of same is connected to the negative output terminal F of the constant voltage regulator circuit A1. The junction of the resistances R20 with R21 is grounded. The upper and lower limit-setting circuit A34 supplies a predetermined upper limit voltage to an inverting input terminal of an operational amplifier A32a forming part of the offset amplifier A32, and a predetermined lower limit voltage to an inverting input terminal of an operational amplifier A33a forming part of the offset amplifier A33.

The output of the offset amplifier A32 is connected to an anode of a diode D3, while the output of the offset amplifier A33 is connected to a cathode of a diode D4. A cathode of the diode D3 and an anode of the diode D4 are connected to a non-inverting input terminal of an operational amplifier A35a forming part of a non-inverting amplifier A35, and grounded via a resistance R30. The output L of the non-inverting amplifier A35 is connected to a non-inverting input terminal of an operational amplifier A7a forming part of a differential amplifier A7 in FIG. 6, and grounded via a resistance R31.

The current waveform detector 5, offset amplifiers A32, A33, upper and lower limit-setting circuit A34, non-inverting amplifier A35, and additional circuits associated therewith collectively form a peak current-detecting circuit A3.

In FIG. 6, reference numerals 10 and 11 designate the LPF and the PWM, respectively. The output of the sine wave-forming circuit 8 is connected via the LPF 10 to an inverting input terminal of the differential amplifier AT. The LPF 10 shapes the stepped waveform of the sine wave signal from the sine wave-forming circuit 8 into a smooth wave form, and the difference between the resulting smooth sine wave signal and the output from the peak current-detecting circuit A3 is amplified by the differential amplifier A7 to thereby correct the sine wave signal in a feedback manner such that if the AC output current from the power unit exceeds a predetermined level by a peak value, the peak value alone is suppressed within the predetermined level.

The output of the differential amplifier A7 is connected to an inverting input terminal of the distortion-correcting circuit A6, which has a non-inverting input terminal thereof connected to the output of the current waveform detector 4. The distortion-correcting circuit A6 corrects the level of the sine wave signal outputted from the sine wave-forming circuit 8 via the LPF 10 by the signal outputted from the voltage waveform detector 4, and thereby outputs a corrected sine wave signal.

Signals indicative of currents detected at the junctions M, N (output current signals) are supplied to the non-inverting input terminal and inverting input terminal of the operational amplifier 51 of the peak current-detecting circuit A3. The operational amplifier 51 forms part of an integrating circuit, where the signals indicative of currents detected at the junctions M, N have their high frequency components removed therefrom. When attention is paid to the signal indicative of a current detected at the junction M alone, a signal containing a DC component and a commercial frequency component appears at the output of the operational amplifier 51. This signal is inversely amplified by an operational amplifier 52 forming part of an integrating circuit into a commercial frequency signal having high frequency components removed therefrom, which is supplied to the offset amplifiers A32, A33. The offset amplifier A32 compares the amplitude of the commercial frequency signal supplied to the non-inverting input terminal of its operational amplifier with the predetermined upper limit voltage supplied from the upper and lower limit-setting circuit A34 to the inverting input terminal of same, and amplifies only a portion (a peak portion in a positive half-cycle) of the voltage of the commercial frequency signal exceeding the predetermined upper limit voltage as a threshold value for determining an excessive peak current (so-called "offset amplification"). The offset amplifier A33 compares the amplitude of the commercial frequency signal supplied to the non-inverting input terminal of its operational amplifier with the predetermined lower limit voltage supplied from the upper and lower limit-setting circuit A34 to the inverting input terminal of same, and amplifies only a portion (a peak portion in a negative half-cycle) of the voltage of the commercial frequency signal lower than the predetermined lower limit voltage as a threshold value for determining an excessive peak current (so-called "offset amplification"). The outputs from the offset amplifiers A32, A33 pass the diodes D3, D4, respectively, and are then superposed upon each other. The resulting superposited signal is a composite signal formed of a voltage portion of the amplified commercial frequency signal which is higher in voltage than the predetermined upper limit voltage and a voltage portion of the amplified commercial frequency signal which is lower in voltage than the predetermined lower limit voltage. When the amplified commercial frequency signal is neither higher than the upper limit voltage nor lower than the lower limit voltage, the composite signal is held at a zero level.

The composite signal is amplified by the non-inverting amplifier A35, and then supplied to the non-inverting input terminal of the operational amplifier of the differential amplifier AT. The differential amplifier A7 compares the composite signal with the sine wave signal from the sine wave-forming circuit 8, to perform differential amplification, i.e. amplifies the difference between the two signals. More specifically, when the AC output current becomes so large that the level of a peak portion in a positive or negative half-cycle of the commercial frequency signal rises above or falls below the predetermined upper or lower limit voltage, i.e. portions of the waveform of the AC output current fall outside the range determined by the predetermined upper and lower limits of amplitude, the sine wave signal is corrected in a feedback manner responsive to the amount of the peak portion above or below the predetermined upper or lower limit such that the peak portion of the sine wave signal is made flat. The sine wave signal which is thus corrected with respect to its peak portions is then supplied to the distortion-correcting circuit A6.

As a result, the AC output current obtained by pulse width modulation based on the corrected sine wave signal has a waveform having peak portions made flat. That is, its peak current value is thus limited. In this connection, it should be noted that when overcurrent flows, only the peak current value is limited, but the supply of the AC output current per se is not cut off, which enables to continue the supply of the AC output power to a load which would cause a temporary excessive rise in the peak current, without any difficulty.

In FIG. 6, reference numeral 111 designates a square wave generator which generates a square wave having a frequency by far higher than the frequency of the sine wave outputted from the LPF 10. The output of the square wave generator 111 is connected to an integrating circuit 112, which integrates the square wave into a triangular wave signal.

The sine wave signal from the LPF 10, which has been corrected by the differential amplifier A7 and the distortion correcting circuit A6, and the triangular wave signal from the integrating circuit 112 are superposed upon each other and the superposed signal is then supplied to an invertor buffer (pulse width modulating circuit) 110. The invertor buffer 110 is formed by an amplifier with a predetermined fixed threshold level which operates such that when a signal having a level exceeding the threshold level is inputted, it supplies an amplified low level signal, while when a signal having a level below the threshold value is inputted, it supplies an amplified high level signal, thus forming a pulse width modulated (PWM) signal. The invertor buffer 110 may be formed by an IC having a fixed threshold level relative to its gate input level, e.g. a threshold level of a CMOS gate on the input terminal side.

The output of the invertor buffer 110 is connected via an invertor 113 to one input terminal of a NAND circuit 114 and on the other hand directly connected to one input terminal of a NAND circuit 115. The NAND circuits 114 and 115 have their other input terminals connected to the output terminal J of the NOR circuit 172 of the operation/stoppage control device 17.

The output of the NAND circuit 114 is connected to a first push-pull amplifier composed of transistors Q9 and Q10. The transistor Q9 of the first push-pull amplifier has its collector connected to the positive output terminal E of the constant-voltage regulator circuit A1, and the transistor Q10 has its collector connected to the negative output terminal F of the constant-voltage regulator circuit A1.

The output of the first push-pull amplifier, i.e. the junction between emitters of the transistors Q9, Q10 is connected to the junction between an anode of a diode D7 and a cathode of a diode D8. The diode D7 has its cathode connected to the positive output terminal E of the constant-voltage regulator circuit A1, while the diode D8 has its anode connected to the negative output terminal F of the regulator circuit A1. The diodes D7, D8 cooperate to damp surging occurring at pulse transformers, hereinafter referred to.

The junction between the anode of the diode D7 and the cathode of the diode D8 is connected to ends of primary coils L3 and L4 of pulse transformers A, C via a capacitor C6 for cutting off low frequency components. The other ends of the primary coils L3, L4 are connected to the negative output terminal F of the constant-voltage regulator circuit A1. Before passing the capacitor C6, the PWM signal has constant amplitude with respect to the reference level but the average voltage (integrated value) of this signal varies with the same period as the sine wave signal from the LPF 10. Therefore, this PWM signal contains a component of the same frequency as that of the sine wave signal. The capacity C6 is set to such a constant that the PWM signal, by passing the capacitor C6, is converted into a pulse train which varies as a whole in reverse phase to the component of the same frequency as that of the sine wave and always has a zero average voltage. This pulse train always having a zero average voltage is applied to the primary coils L3, L4 of the pulse transformers A, C.

The output of the NAND circuit 115 is connected to a second push-pull amplifier composed of transistors Q11 and Q12, like the first push-pull amplifier. The output of the second push-pull amplifier is connected to the junction between an anode of a diode D9 and a cathode of a diode D10. This junction is also connected to ends of primary coils L5 and L6 of pulse transformers B and D via a capacitor C7 which has the same constant as the capacitor C6.

Referring again to FIG. 5, the driving signal circuit which is connected to gates of the FET's Q5–Q8 will be described. One end of the secondary coil of the pulse transformer A is connected to a gate of the FET Q5 via a series circuit formed by a damping resistance R5, and a capacitor C8 for reproducing the PWM signal before passing the capacitor C6, and a parallel circuit formed by a resistance R6 and a diode D13, while the other end of the secondary coil of the pulse transformer A is connected to a source of the FET Q5. The junction between the capacitor C8 and the parallel circuit formed by the resistance R6 and the diode D13 is connected to the above other end of the secondary coil of the pulse transformer A via a series circuit formed by Zener diodes D5 and D6. The diode D13 has its anode connected to the Gate of the FET Q5, and the Zener diodes D5, D6 have their anodes connected with each other.

Provided between a secondary coil of each of the pulse transformers B, C and D and a gate of a corresponding one of the FET's Q6–Q8 is the same circuitry as the above described one provided between the secondary coil of the pulse transformer A and the gate of the FET Q5.

In FIG. 6, an invertor 116 and an AND circuit 117 form a gate circuit for the PWM signal, which opens when the signal Q-bar from the D flip flop 21 goes low. Therefore, the PWM signal is allowed to be outputted at a time point the signal Q-bar rises, i.e. at the zero crossing point where the AC output voltage detected by the voltage waveform detector 4 upwardly crosses a zero level.

Figure 8:
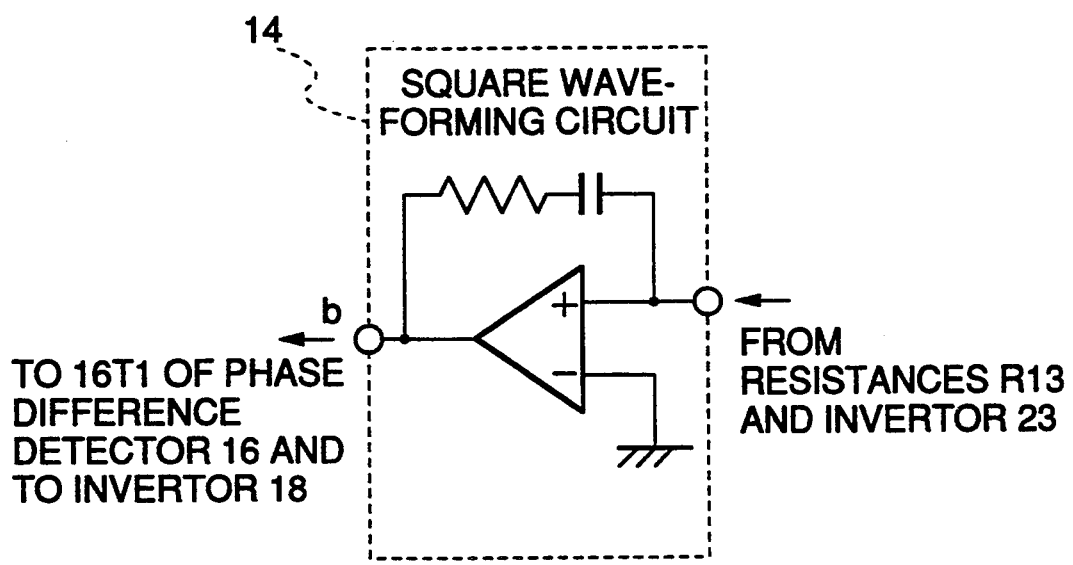
FIG. 8 is a circuit diagram showing an example of a square wave-forming circuit appearing in FIG. 1.

FIG. 8 shows, by way of example, details of the square wave-forming circuit 14 for converting the AC output voltage signal into the square wave signal b. This circuit is a positive feedback amplifier circuit using an operational amplifier. The signal a having a sinusoidal waveform and corresponding in phase to the phase of the AC output voltage appearing across the output lines is supplied from the voltage waveform detector 4 via the operational amplifier 12 to the square wave-forming circuit 14, where it is amplified in a positive feedback manner into the square wave signal b having a steep rise/fall characteristic.

Figure 9:
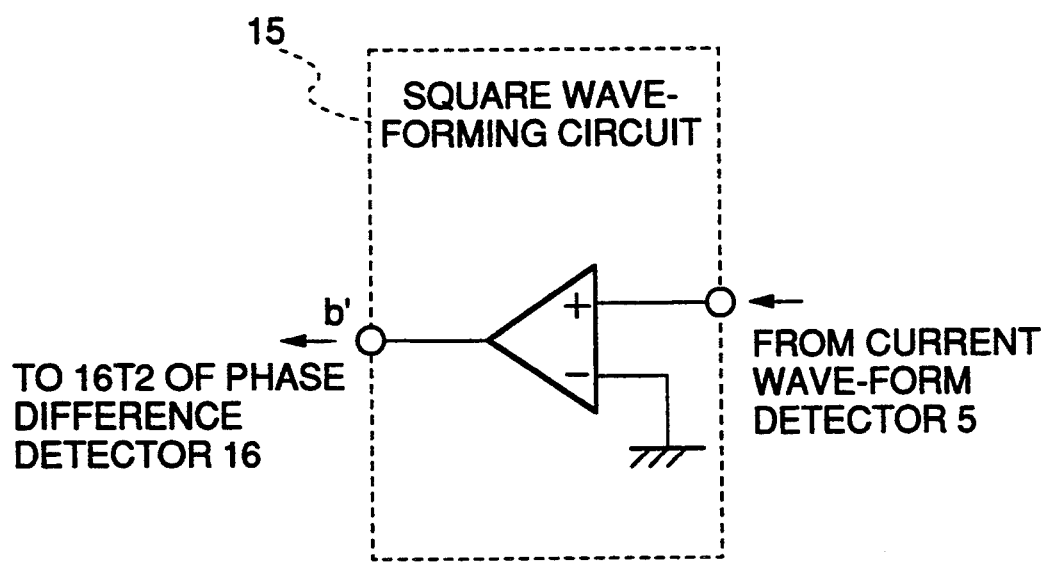
FIG. 9 is a circuit diagram showing an example of another square wave-forming circuit appearing in FIG. 1.

FIG. 9 shows, by way of example, details of the square wave-forming circuit 15 for converting the AC output current signal into the square wave signal b'. This circuit is a high gain amplifier circuit using an operational amplifier. The square wave-forming circuit 15 is supplied with the output current signal having a sinusoidal waveform and corresponding in phase to the phase of the load current from the current detector 5, and converts same into the square wave signal b' having a steep rise/fall characteristic.

Figure 10:
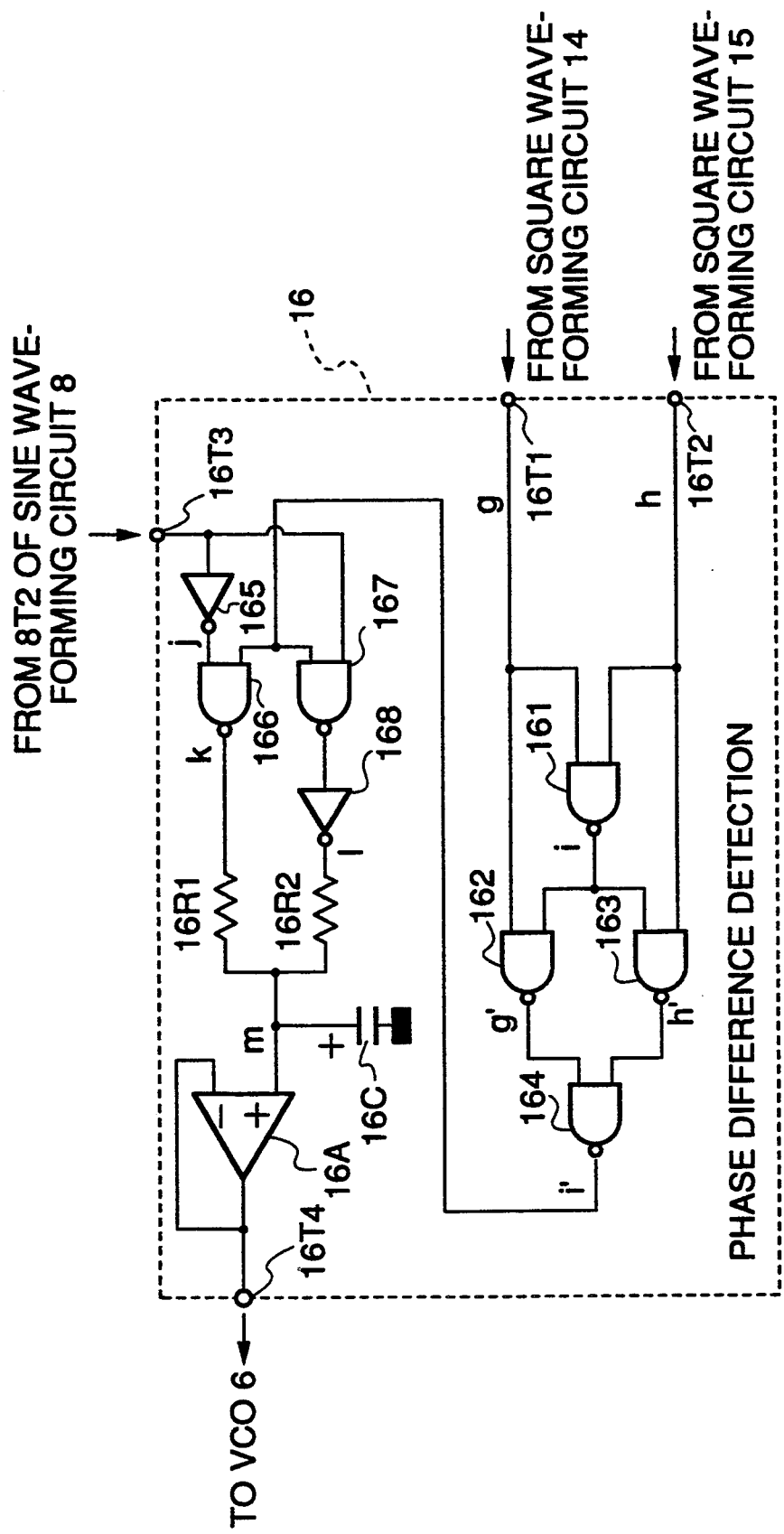
FIG. 10 is a circuit diagram showing an example of a phase difference detector appearing in FIG. 1.

FIG. 10 shows, by way of example, details of the phase difference detector 16. The operation of the phase difference detector 16 will now be described with reference to FIG. 11 as well. The square wave signal g (as shown at (a) in FIG. 11) from the square wave-forming circuit 14, which represents the phase of the AC output voltage, and the square wave signal h (as shown at (b) of FIG. 11) from the square wave-forming circuit 15, which represents the phase of the AC output current, are supplied via respective input terminals 16T1, 16T2 to a NAND circuit 161, which in turn supplies a NAND signal i (as shown at (c) in FIG. 11). The signals i and g are supplied to a NAND circuit 162, which in turn supplies a NAND signal g' (as shown at (d) in FIG. 11), whereas the signals i and h are supplied to a NAND circuit 163, which in turn supplies a NAND signal h' (as shown at (e) in FIG. 11). The signals g' and h' are supplied to a NAND circuit 164, which in turn supplies a NAND signal i' (as shown at (f) in FIG. 11). As can be understood from (a), (b), and (f) in FIG. 11, the NAND signal i' has a pulse width corresponding to the phase difference between the AC output voltage and current. The pulse signal i' rises at both a leading edge and a trailing edge of the square wave signal g having a relatively advanced phase.

Figure 11:
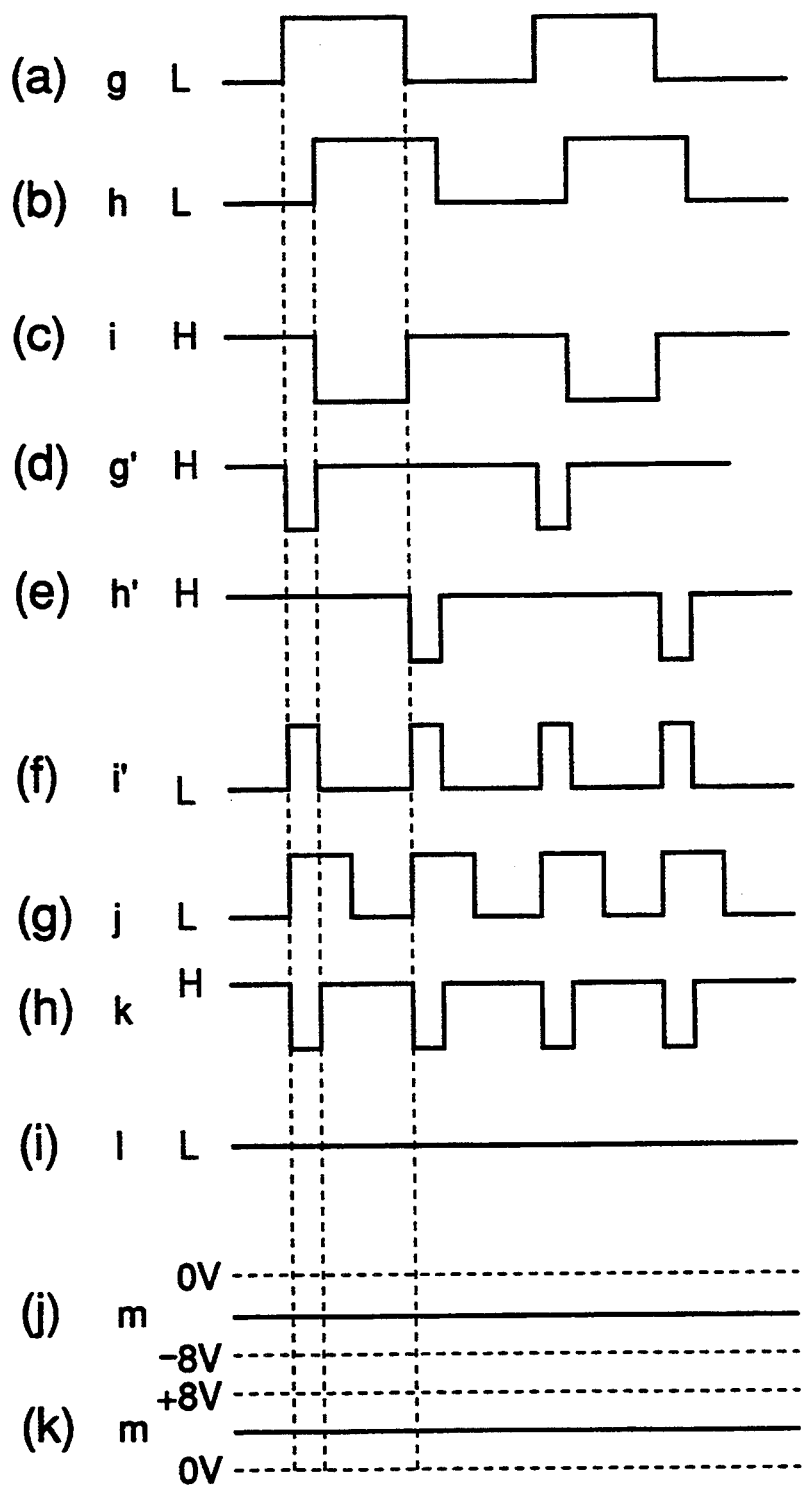
FIG. 11 is a timing chart useful in explaining the operation of the phase difference detector of FIG. 7.

Invertors 165, 168, NAND circuits 166, 167, a capacitor 16C, and resistances 16R1, 16R2 cooperate to form a phase difference-to-voltage convertor for generating voltage corresponding to the phase difference between the AC output voltage and current. A signal j (as shown at (g) in FIG. 11) is outputted from an invertor 165 which inverts a pulse signal supplied from the sine wave-forming circuit 8 via an input terminal 16T3. The signal j, which indicates the phase of the oscillation signal outputted from the VCO 6, has a frequency equivalent to a period half as large as the period of the target output waveform signal and is obtained by dividing each half cycle of the target output waveform signal into a first half and a second half to use them for determining whether the phase difference signal i indicates an AC output voltage having an advanced phase or one having a retarded phase relative to the AC output current. Further, the signal j determines a time period for opening the gate for the signal i'. In FIG. 10, while the signal j assumes a high level, the signal i' is outputted as a signal k from the NAND circuit 166. While the signal j assumes a low level, the signal i' is outputted from the NAND circuit 167. However, while the signal j assumes a low level, the signal i' assumes a low level, so that the output from the NAND circuit 167 and hence an output signal 1 from the invertor 168 remains unchanged. More specifically, as shown at (h) and (i) in FIG. 11, whenever the signal i' goes low, the signal k goes high whereas the signal 1 remains low. Here, the high level means 8V, and the low level means −8V. Therefore, when the signal k assumes a high level and the signal 1 assumes a low level, the two voltages of 8V and −8V cancel each other to form a signal m (as shown at (j) in FIG. 11) having 0V. When the signal k goes low, both the signals k and l assume a low level, so that discharge of electricity from the capacitor 16c toward −8V occurs, and then when the signal k goes high, charge of electricity toward 0V occurs. After all, the average voltage varies within a range of 0V to −8V as shown at (j) of FIG. 11. In this connection, the timing shown at (j) of FIG. 11 shows an example in which the output current has a retarded phase relative to the output voltage. However, when the output current has an advanced phase relative to the output voltage, the average voltage varies between 0V and +8V as shown at (k) of FIG. 11. Further, due to the fact that the signal j has a frequency equivalent to half the period of the output target waveform, the voltage varies within a range of −4V to +4V in response to the phase difference. The voltage corresponding to the phase difference is supplied via the output terminal 16T4 to the VCO 6.

Figure 12:
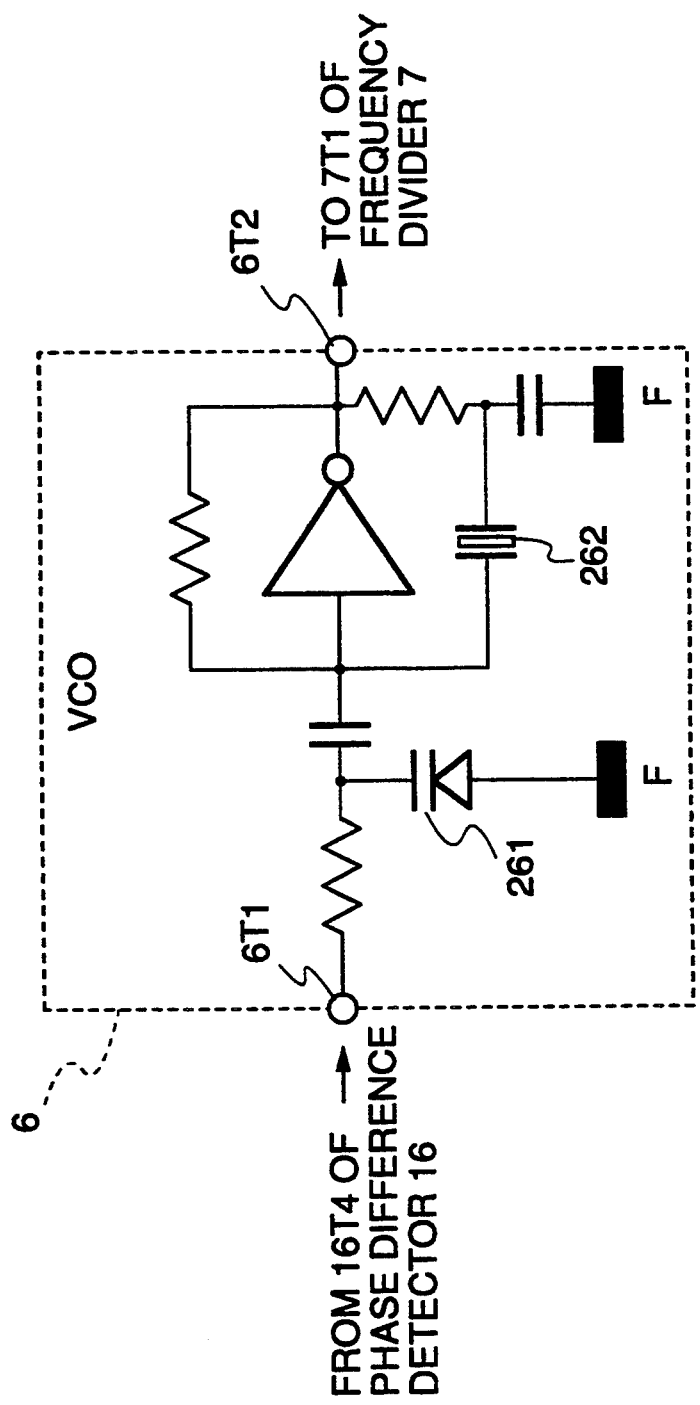
FIG. 12 is a circuit diagram showing an example of a VCO appearing in FIG. 1.

FIG. 12 shows, by way of example, details of the VCO 6 for controlling the oscillation frequency by means of a vatactor diode 261. More specifically, it utilizes the fact that if reverse bias voltage applied to the vatactor diode is increased, its junction capacity decreases. For example, it can increase the frequency by increasing the reverse bias voltage, which enables to increase the frequency when the voltage of the AC output has an advanced phase relative to that of the current of same, and decrease the frequency when the former has a retarded phase relative to that of the latter. The VCO 6 is supplied with voltage corresponding to the phase difference from the phase difference detector 16 via an input terminal 6T1, and supplies an oscillation signal having a frequency corresponding to the voltage via an output terminal 6T2. If a crystal resonator 262 is used in the VCO 6, the frequency is stable but can be varied by a combination capacity controlled by such a varactor diode 261 within a range of approx. ±0.01%.

Figure 13:
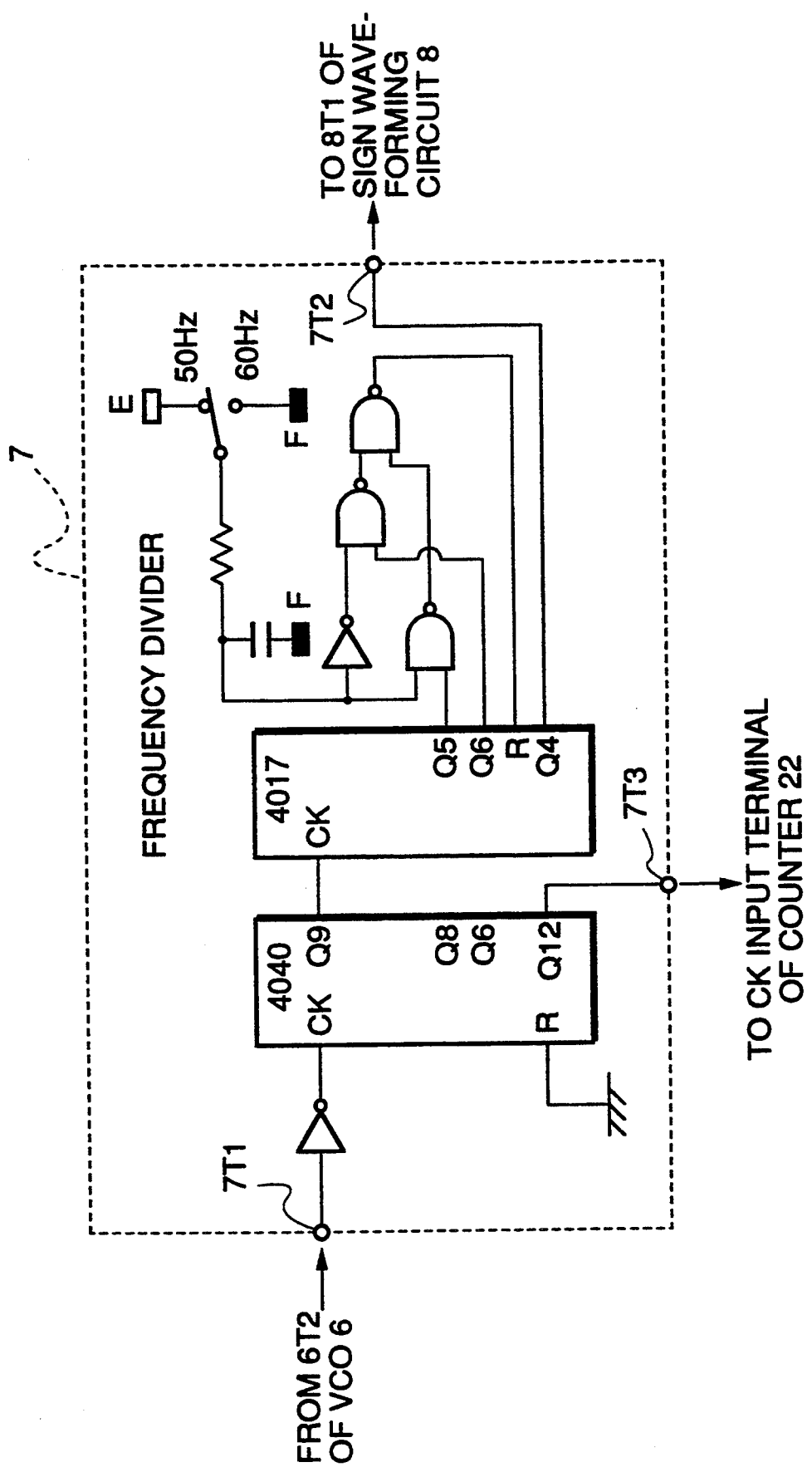
FIG. 13 is a circuit diagram of an example of a frequency divider appearing in FIG. 1.

FIG. 13 shows, by way of example, details of the frequency divider 7, which is formed e.g. by counters such as μP74HC 4040, μP74HC 4017 manufactured and sold by NEC Corporation, etc. The frequency divider 7 has an input terminal 7T1 supplied with the oscillation signal from the VCO 6, and an output terminal 7T2 which outputs a frequency-divided signal obtained by dividing the oscillation signal.

Figure 14:
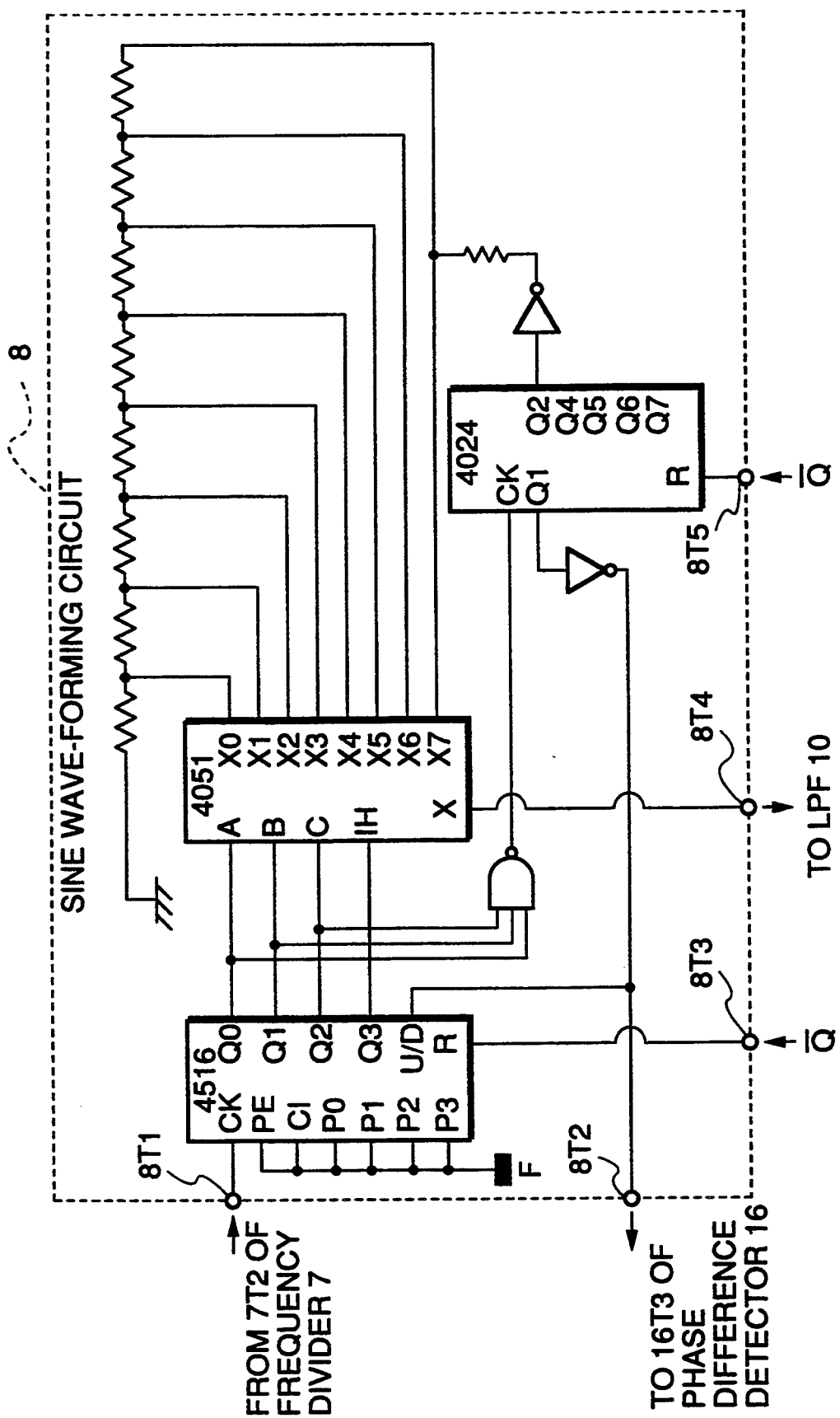
FIG. 14 is a circuit diagram showing an example of a sine wave-forming circuit appearing in FIG. 1.

FIG. 14 shows, by way of example, details of the sine wave-forming circuit 8, which is formed e.g. by a multiplexer 4051 such as μP74HC 4051 sold by NEC Corporation, etc. The multiplexer 4051 has an output terminal X which is connected to one of input terminals X0 to X7 depending on the states of terminals A, B, and C. The input terminals X0 to X7 are connected to junctions of respective corresponding voltage-dividing resistances. Each junction has an electric potential level according to its electrical position. Voltages from different junctions, which are inputted via the input terminals X0 to X7, are sequentially outputted from the output terminal X in response to the frequency-divided signal inputted from the frequency divider 7 to the sine wave-forming circuit 8, to thereby form a sine wave signal having a stepped sinusoidal waveform, which is supplied via a terminal 8T4 to the LPF 10. Further, in FIG. 14, reference numeral 8T1 designates an input terminal for receiving the frequency-divided signal from the frequency divider 5, 8T2 an output terminal for supplying a pulse signal indicative of the phase of the oscillation signal to the phase difference detector 16, and 8T3 and 8T5 resetting terminals. The resetting terminals 8T3, 8T5 are supplied with the signal Q-bar, so that the sine wave signal starts to be outputted when the signal Q-bar falls, i.e. when the AC output voltage upwardly crosses a zero level, whereby the AC output voltage and the sine wave signal (target output waveform signal) are made coincident in phase.

As described hereinabove, the frequency of the oscillation signal from the VCO 6 can be automatically controlled by voltage corresponding to the phase difference between the voltage of the AC output and the current of same to thereby automatically make the phases of the voltage and current coincident with each other, which enables to automatically make the phases of outputs from a plurality of (i.e. any number of) generators in parallel operation coincident with each other.

In this connection, when the power factor has a value of 1, the phase of the AC output voltage and that of the AC output current coincide with each other, i.e. there is no phase difference therebetween. When the power factor is not equal to 1, i.e. when the load connected to the invertor-controlled power unit is an inductive load or a capacitive load, the voltage and the current are not coincident in phase. However, other invertor-controlled power units in parallel operation with the present power unit also generate output power having a similar phase difference between output voltage and output current thereof to that of the present generator, and hence no current flows between the generators. That is, stable parallel operation is performed in the state in which each generator has a phase difference between the output voltage and the output current. During operation at such a lower power factor than 1, the frequency of the AC output is deviated from a value assumed during operation at a power factor of 1. However, the degree of deviation is within 0.01%, which is smaller than the tolerances of fluctuations occurring in a commercial power supply.

If the present invertor-controlled power unit which has already started generating electricity is subsequently connected in parallel connection with another invertor-controlled power unit which has also already started generating electricity, electric current alternately flows from one power unit to the other via the output lines connected due to a difference in phase between the waveforms of the output voltages from the respective power units, as described hereinbefore, so that voltage is produced across the coils L1, L2 of the LPF 3b. If the amount of flow-in current is large, i.e. the difference in the phase of the voltages is large, and hence the rectifying/smoothing circuit 2 as a DC power source circuit is brought into an overvoltage state, the voltage at the inverting input terminal of the overvoltage detecting circuit 9 in FIG. 5 is largely shifted in a negative direction to cause the output from the output terminal P thereof to go high. Accordingly, the output terminal J of the NOR circuit 172 of the operation/stoppage control device 17 in FIG. 4 goes low, so that the outputs from the NAND circuits 114, 115 go high to inhibit the first and second push-pull amplifiers of the PWM 11 from outputting pulses dependent on the PWM signal outputted from the invertor butter 110, i.e. inhibit the PWM 11 from supplying the PWM signal to the invertor circuit 3a, which accordingly is rendered inoperative.

When the invertor 3a is thus rendered inoperative, the output terminals T1, T1 are supplied with output voltage from the other invertor-controlled power unit connected in parallel with the present power unit, and the voltage waveform detector 4 detects the waveform of the output voltage applied between the output lines connected to the output terminals T1, T1.

After the overvoltage state is eliminated, the aforementioned D flip flop 21 allows to make the invertor circuit 3a operative at a time point where the output voltage from the other invertor-controlled power unit detected by the voltage waveform detector 4 is equal to zero volt, whereby the present power unit starts a synchronized parallel operation with the other power unit.

After the start of the parallel operation, the waveform of the output current is detected by the current waveform detector 5. On this occasion, the difference in phase between the output voltages from the power units connected in parallel with each other for parallel operation is small, and hence the internal voltage of the present power unit does not rise so much as to cause the overvoltage-detecting circuit thereof to operate. Then, the phase difference between the waveform of the output voltage detected by the voltage waveform detector 4 and that of the output current detected by the current waveform detector 5 is reduced to zero in the manner described hereinbefore to thereby make stable the parallel operation of the power units.

What is claimed is:

1. An invertor-controlled power unit which is arranged for connection in parallel with another invertor-controlled power unit, said first-mentioned invertor-controlled power unit comprising:
   a direct current power source circuit;
   an invertor circuit for effecting switching control of an output from said direct current power source circuit in response to a control signal to thereby convert said output into an alternating current output having a predetermined frequency;
   a pair of output lines conducting said alternating current output from said invertor circuit;
   output terminals connected to said pair of output lines for parallelly connecting said first-mentioned invertor-controlled power unit to said another invertor-controlled power unit;
   voltage waveform-detecting means for detecting a waveform of voltage appearing between said output lines;
   overvoltage-detecting means for detecting an overvoltage state of said direct current power source circuit;
   reference signal-generating means for generating a target output waveform signal having said predetermined frequency, said invertor circuit effecting said switching control of said output from said direct current power source circuit based on said target output waveform signal;
   control signal-generating means for converting said target output waveform signal into said control signal and for supplying said control signal to said invertor circuit;
   inhibiting means for rendering said control signal-generating means inoperative while said overvoltage-detecting means detects said overvoltage state of said direct current power source circuit; and
   synchronizing means for causing said control signal-generating means to start supplying said control signal to said invertor circuit at a timing at which the waveform of the voltage between said output lines detected by said voltage waveform-detecting means crosses a substantially zero volt level, and when said overvoltage state of said direct current power source circuit is not detected, whereby said alternating current output is delivered from said invertor circuit in synchronism with said voltage waveform appearing between said output lines.

2. An invertor-controlled power unit according to claim 1, further including a low-pass filter for shaping a waveform of an output from said power unit, said low-pass filter comprising inductance elements connected between said output lines, said invertor circuit cooperating with said low-pass filter to convert said output from said direct current power source circuit into said alternating current output having said predetermined frequency.

3. An invertor-controlled power unit according to claim 2, wherein said synchronizing means renders inoperative said control signal-generating means and inhibits said reference signal-generating means from supplying said target output waveform signal to said control signal-generating means, while said overvoltage-detecting means detects said overvoltage state of said direct current power source circuit.

4. An invertor-controlled power unit according to claim 3, further including:
   current waveform-detecting means for detecting a current waveform of said alternating current output having said predetermined frequency;
   phase difference-detecting means for detecting a difference in phase between said current waveform detected by said current waveform-detecting means and said voltage waveform detected by said voltage waveform-detecting means; and
   reference signal-correcting means for modifying a frequency of said target output waveform signal such that said difference in phase detected by said phase difference-detecting means is reduced.

5. An invertor-controlled power unit according to claim 2, further including:
   current waveform-detecting means for detecting a current waveform of said alternating current output having said predetermined frequency;
   phase difference-detecting means for detecting a difference in phase between said current waveform detected by said current waveform-detecting means and said voltage waveform detected by said voltage waveform-detecting means; and
   reference signal-correcting means for modifying a frequency of said target output waveform signal such that said difference in phase detected by said phase difference-detecting means is reduced.

* * * * *

UNITED STATES PATENT AND TRADEMARK OFFICE
CERTIFICATE OF CORRECTION

PATENT NO. : 5,400,236
DATED : March 21, 1995
INVENTOR(S) : SHIMIZU et al.

It is certified that error appears in the above-indentified patent and that said Letters Patent is hereby corrected as shown below:

Title page, Item [54], and in column 1, line 2, the Title,

"INVENTOR" should be --INVERTOR--

Signed and Sealed this

Second Day of April, 1996

Attest:

BRUCE LEHMAN

Attesting Officer     Commissioner of Patents and Trademarks